United States Patent
Laville et al.

(10) Patent No.: US 10,442,089 B2
(45) Date of Patent: Oct. 15, 2019

(54) HAND INTENDED FOR BEING PROVIDED ON A HUMANOID ROBOT WITH IMPROVED FINGERS

(71) Applicant: SOFTBANK ROBOTICS EUROPE, Paris (FR)

(72) Inventors: Jérémy Laville, Paris (FR); Vincent Clerc, Clamart (FR); Bruno Maisonnier, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 0 days.

(21) Appl. No.: 15/111,476

(22) PCT Filed: Jan. 22, 2015

(86) PCT No.: PCT/EP2015/051236
§ 371 (c)(1),
(2) Date: Jul. 13, 2016

(87) PCT Pub. No.: WO2015/110522
PCT Pub. Date: Jul. 30, 2015

(65) Prior Publication Data
US 2016/0339589 A1    Nov. 24, 2016

(30) Foreign Application Priority Data
Jan. 22, 2014 (FR) .................................. 14 50532

(51) Int. Cl.
*B25J 15/00* (2006.01)

(52) U.S. Cl.
CPC .................. *B25J 15/0009* (2013.01)

(58) Field of Classification Search
CPC ...... B25J 15/0009; B25J 15/04; B25J 15/103; B25J 15/10; B25J 9/104; B25J 3/00
See application file for complete search history.

(56) References Cited

U.S. PATENT DOCUMENTS

| 4,466,649 A | 8/1984 | Ozawa |
| 4,834,761 A * | 5/1989 | Walters ..................... B25J 9/104 254/228 |

(Continued)

FOREIGN PATENT DOCUMENTS

| DE | 10 2006 009 559 B3 | 5/2007 |
| FR | 2 065 112 A5 | 7/1971 |

(Continued)

*Primary Examiner* — Stephen A Vu
(74) *Attorney, Agent, or Firm* — Baker & Hostetler LLP (57) ABSTRACT

A hand intended for a humanoid robot comprises a palm and at least one finger articulated to the palm, the finger comprising at least one phalanx and an articulation linking the phalanx to the palm, the phalanx extending in a main direction. According to the invention, the articulation comprises an elastic joining piece allowing several degrees of freedom. The hand comprises motorization means for a degree of freedom in rotation out of the degrees of freedom made possible by the joining piece, the motorized degree of freedom in rotation allowing a relative movement about an axis at right angles to the main direction of the phalanx. The other degrees of freedom out of the degrees of freedom made possible by the joining piece are not motorized.

17 Claims, 4 Drawing Sheets

(56) References Cited

U.S. PATENT DOCUMENTS

| | | | | |
|---|---|---|---|---|
| 4,921,293 A * | 5/1990 | Ruoff | ............... | A61F 2/583 |
| | | | | 294/106 |
| 5,200,679 A | 4/1993 | Graham | | |
| 6,244,644 B1 * | 6/2001 | Lovchik | ............... | B25J 9/104 |
| | | | | 294/111 |
| 7,296,835 B2 * | 11/2007 | Blackwell | ............ | B25J 9/104 |
| | | | | 294/106 |
| 7,549,688 B2 * | 6/2009 | Hayakawa | ........ | B25J 9/0009 |
| | | | | 294/106 |
| 8,052,185 B2 * | 11/2011 | Madhani | ............ | B25J 9/1045 |
| | | | | 294/106 |
| 8,342,586 B2 * | 1/2013 | Sim | ............... | B25J 5/00 |
| | | | | 294/106 |
| 8,565,918 B2 * | 10/2013 | Abdallah | ............ | H01R 13/17 |
| | | | | 700/245 |
| 9,248,575 B2 * | 2/2016 | Miyazawa | ........ | B25J 15/0009 |

FOREIGN PATENT DOCUMENTS

| | | |
|---|---|---|
| JP | H05-301191 A | 11/1993 |
| JP | H10-249774 A | 9/1998 |
| JP | 2004-090193 A | 3/2004 |
| JP | 2004-521765 A | 7/2004 |
| JP | 2006-123149 A | 5/2006 |
| JP | 2011-050529 A | 3/2011 |
| KR | 2011-0005146 A | 1/2011 |
| WO | 2008/058061 A2 | 5/2008 |
| WO | 2012/042054 A2 | 4/2012 |
| WO | 2014/045433 A1 | 3/2014 |
| WO | 2014/074840 A1 | 5/2014 |

\* cited by examiner

HAND INTENDED FOR BEING PROVIDED ON A HUMANOID ROBOT WITH IMPROVED FINGERS

CROSS-REFERENCE TO RELATED APPLICATIONS

This application is a National Stage of International patent application PCT/EP2015/051236, filed on Jan. 22, 2015, which claims priority to foreign French patent application No. FR 1450532, filed on Jan. 22, 2014, the disclosures of which are incorporated by reference in their entirety.

FIELD OF THE INVENTION

The invention relates to a hand intended for a humanoid robot.

BACKGROUND

The human hand is an extremely complex part of the human body. It comprises several fingers articulated around the palm of the hand. Moreover, each finger has several mutually articulated phalanges. Each articulation is motorized by means of muscles. The different articulations of the hand notably make it possible to grip objects of various forms. Numerous attempts have been made in humanoid robots to best approximate human functionalities. Reproducing movements of the hand in a robot requires a large number of independent actuators to ensure the gripping of various objects. This increases the complexity of the robot both in terms of the number of independent actuators to be provided and in the driving of these different actuators that have to be controlled in a coordinated manner.

SUMMARY OF THE INVENTION

The invention aims to simplify production of a hand of a humanoid robot while retaining its suitability for gripping objects of different forms.

To this end, the one subject of the invention is a hand intended for a humanoid robot, the hand comprising a palm and at least one finger articulated to the palm, the finger comprising at least one phalanx and at least one articulation linking the phalanx to the palm, the phalanx extending in a main direction, characterized in that the articulation comprises an elastic joining piece allowing several degrees of freedom, in that the hand comprises motorization means for a degree of freedom in rotation out of the degrees of freedom made possible by the joining piece, the motorized degree of freedom in rotation allowing a relative movement about an axis at right angles to the main direction of the phalanx and in that the other degrees of freedom out of the degrees of freedom made possible by the joining piece are not motorized.

Each finger of the hand can comprise several consecutive phalanges, two consecutive phalanges being linked by an articulation comprising an elastic joining piece similar to the joining piece linking the phalanx to the palm.

Each elastic joining piece advantageously has a neutral position defined in such a way that the motorization means allow an angular travel of the articulation comprising the elastic joining piece concerned on either side of the neutral position.

In the invention, the presence of an elastic joining piece in each articulation makes it possible to improve the compliance of the finger to the form of the objects that it is likely to encounter. The compliance of the finger should be understood to be its capacity to adjust to the stresses and forces that are exerted thereon.

BRIEF DESCRIPTION OF THE DRAWINGS

The invention will be better understood and other advantages will become apparent on reading the detailed description of an embodiment given by way of example, the description being illustrated by the attached drawing in which.

In the interests of clarity, the same elements will bear the same references in the different figures.

DETAILED DESCRIPTION

Figure 1:
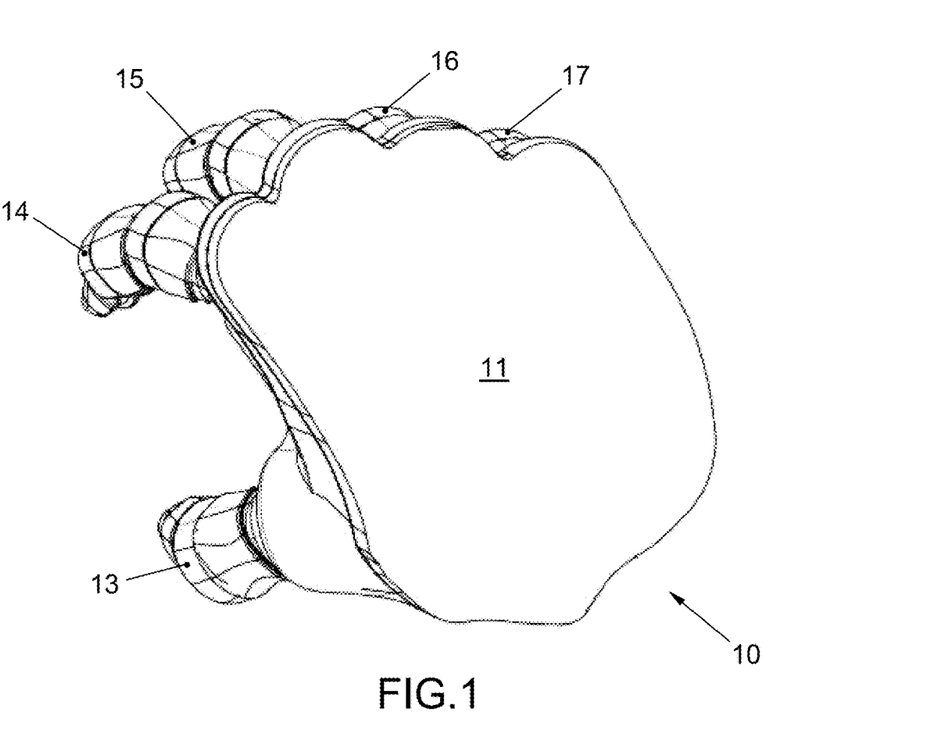
FIG. 1 is a perspective representation of a hand intended for a humanoid robot.

FIG. 1 represents a hand 10 intended for a humanoid robot. The hand 10 comprises a palm 11 and five fingers 13 to 17. The fingers are articulated to the palm 11 in such a way as to allow objects to be gripped between the fingers 13 to 17. Like a human hand, the finger 13 is a thumb. An object grasped by the hand is held between the thumb 13 and the other fingers 14 to 17. The invention is not limited to a hand having five fingers. The number of fingers can be reduced to simplify the design of the hand or even increased to allow particular objects to be gripped.

Figure 2:
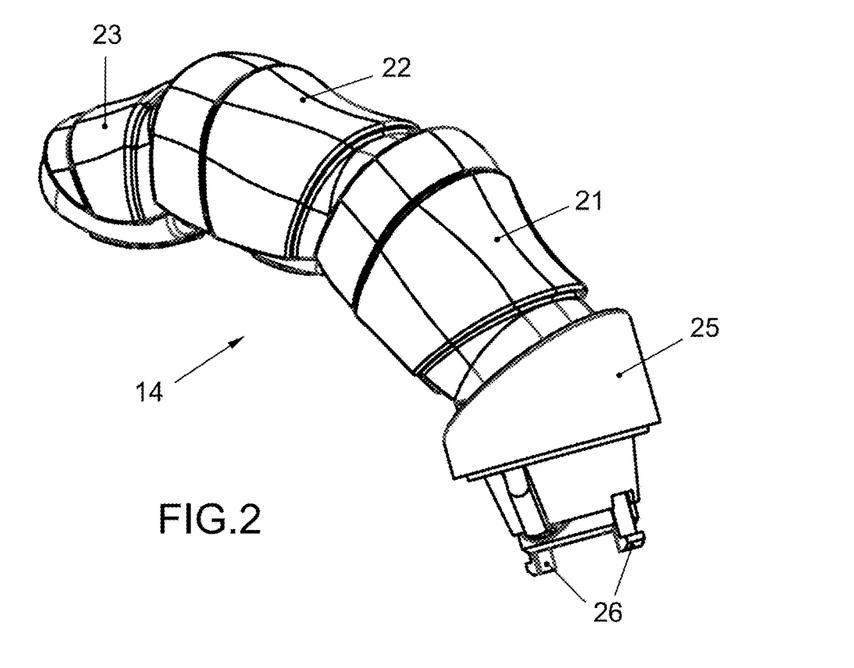
FIG. 2 is a perspective representation of a finger with which the hand of FIG. 1 is equipped.

FIG. 2 shows a perspective representation of a finger with which the hand 10 is equipped. It is the index finger 14 comprising three consecutive phalanges 21, 22 and 23. The phalanges are articulated in series relative to the palm 11 of the hand 10. More specifically, the phalanx 21 is articulated on the palm 11. The phalanx 22 is articulated on the phalanx 21. The phalanx 23 is articulated on the phalanx 22 and forms the free end of the finger 14. The three phalanges 21, 22 and 23 are defined in the image of a human finger. As previously for the number of fingers, without departing from the scope of the invention, it is possible to define a finger having another number of phalanges, reducing the number thereof to facilitate the design of the hand or increasing the number thereof for particular uses of the hand.

More generally a hand of the invention can be formed by a clamp making it possible to grasp an object. The clamp comprises at least one mobile finger equipped with several articulated phalanges allowing several points of contact with the object grasped. Facing this articulated finger, it is possible to arrange a fixed finger or even, directly, the palm of the hand.

It has been seen above that the phalanx 21 is articulated on the palm 11. In FIG. 2, a fitting piece 25 can be distinguished which is intended to be secured to the palm 11 for example by means of clips 26. The articulation of the finger 14 is produced between the phalanx 21 and the fitting piece 25. From a functional point of view, the fitting piece 25 forms an integral part of the palm 11.

The following description describes the index finger 14. Obviously, the invention can be implemented for each of the fingers 14 to 17 and even for the thumb 13.

Figure 3:
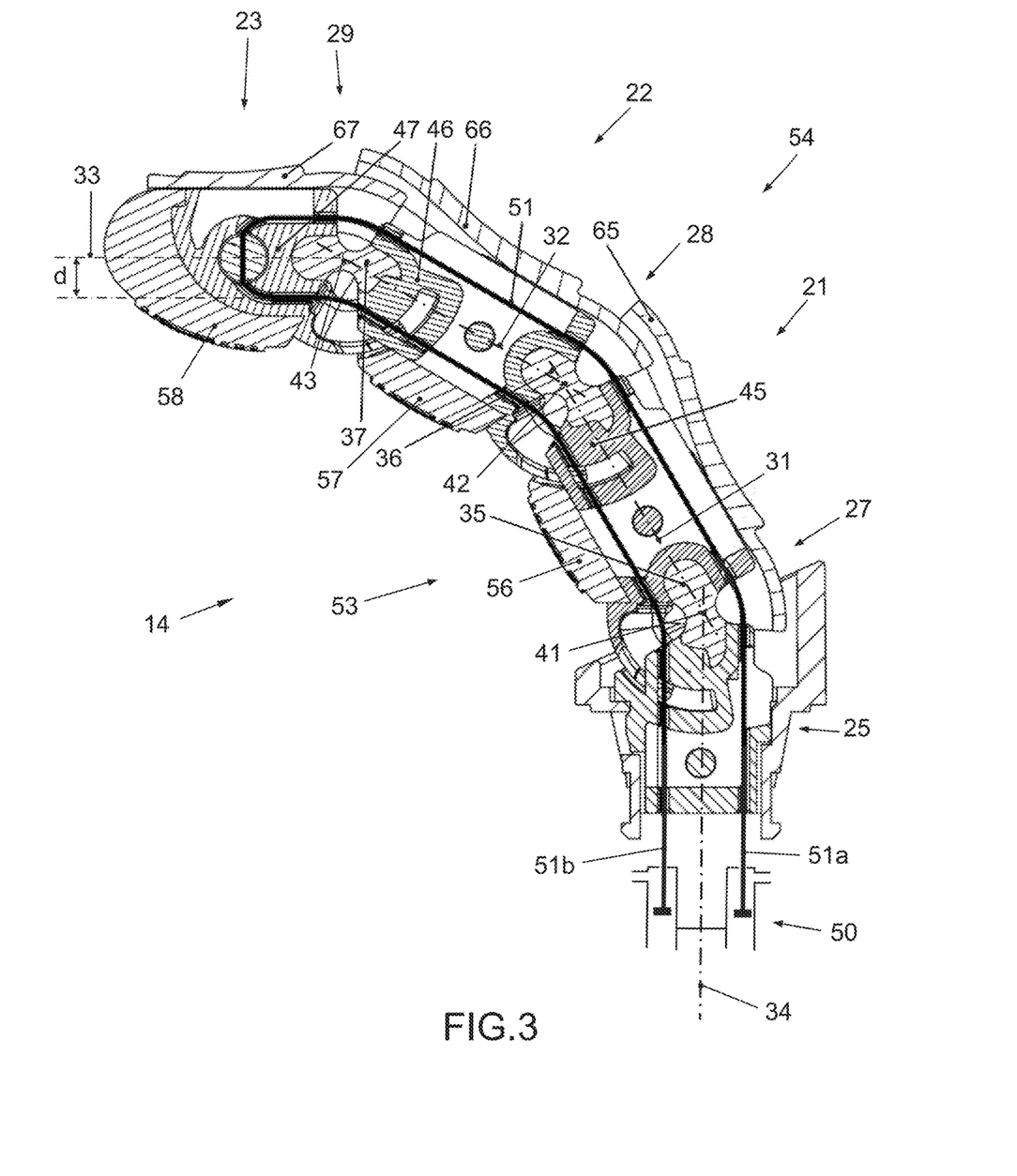
FIG. 3 represents the finger of FIG. 2 in longitudinal cross section.

FIG. 3 represent the finger 14 in longitudinal cross section. The articulation between the fitting piece 25 and the phalanx 21 bears the reference 27. The articulation between the phalanges 21 and 22 bears the reference 28 and the articulation between the phalanges 22 and 23 bears the reference 29.

In the example represented, the other fingers 13, 15, 16 and 17 are similar to the finger 14. They each comprise several articulated phalanges, for example three phalanges to approximate the human anatomy.

Each of the phalanges 21, 22 and 23 extends in a main direction, respectively 31, 32 and 33. The finger 14 comprises elastic joining pieces making it possible to mutually articulate the phalanges and the first phalanx 21 with respect to the palm 11. The joining pieces form the articulations 27, 28 and 29. More specifically, a joining piece 35 links the fitting piece 25, and therefore the palm 11, to the first phalanx 21. A joining piece 36 links the phalanges 21 and 22. A joining piece 37 links the phalanges 22 and 23. The joining piece 35 allows several degrees of freedom, between the first phalanx 21 and the palm 11. The joining pieces 36 and 37 allow several degrees of freedom between two consecutive phalanges that each of the joining pieces 36 and 37 links. The joining pieces 35, 36 and 37 are each formed from a block of elastic material embedded in rigid parts between which they are arranged. A joining piece allows several degrees of freedom between the two rigid pieces that it links, mainly the three rotations but also the three translations with small travels.

For each of the articulations 27, 28, and 29, one of the rotations is motorized and the other degrees of freedom made possible by the joining piece concerned are not motorized. In other words, the hand 10 comprises motorization means for a degree of freedom in rotation out of the degrees of freedom made possible by the joining piece of the articulation concerned.

The motorized rotation takes place about an axis at right angles to the main directions of the two neighboring phalanges, that is to say an axis 42 for the articulation 28 and an axis 43 for the articulation 29. For the articulation 27, between the first phalanx 21 and the palm 11, the motorized rotation takes place about an axis 41 at right angles to the direction 31 and at right angles to an axis 34 forming a main direction of the fitting piece 25. The main direction 34 is fixed relative to the palm 11.

The different degrees of freedom allowed by a joining piece allow the finger 14 a certain flexibility to adapt to the form of various objects that the hand 10 is likely to catch or strike. This flexibility makes it possible to improve the compliance of the hand to the form of the objects that it is likely to encounter. By virtue of the invention, the hand improves its capacity to adjust to the stresses and forces which are exerted thereon.

The different elastic joining pieces 35, 36 and 37 can be identical and therefore have an identical stiffness. Alternatively, the different elastic joining pieces 35, 36 and 37 each have a stiffness that decreases with distance away from the palm 11. This decreasing stiffness makes it possible to modulate the force that each phalanx 21, 22 and 23 exerts on an object grasped by the hand 10.

The stiffness of each articulation can differ according to the degrees of freedom made possible by the articulation concerned. The decreasing stiffness may concern only the motorized degree of freedom and/or the other non-motorized degrees of freedom.

Each phalanx comprises a rigid armature. More specifically, the phalanx 21 comprises a rigid armature 45, the phalanx 22 comprises a rigid armature 46 and the phalanx 23 comprises a rigid armature 47. The joining piece 35 is embedded in the fitting piece 25 and in the rigid armature 45. The joining piece 36 is embedded in the rigid armatures 45 and 46. The joining piece 37 is embedded in the rigid armatures 46 and 47. The flexibility of the joining pieces 35, 36 and 37 can be obtained between the embedments of each. It is possible to produce the three joining pieces 35, 36 and 37 in the same material, such as, for example, a silicone-based material. The decreasing stiffness can be obtained by thinning the joining pieces between their respective embedments. More generally, the stiffness of each articulation can be obtained by the definition of the form of the joining piece concerned.

The motorization according to a single degree of freedom can be done autonomously for each of the articulations between the phalanges and between the palm 11 and the first phalanx 21. Advantageously, the motorization means comprise an actuator 50 common to all the articulations 27, 28 and 29 of the finger 14. The common actuator 50 makes it possible to simplify the design and the driving of the hand. Together with the decreasing stiffness of the joining pieces 35, 36 and 37, the common actuator 50 makes it possible to improve the gripping of objects grasped by the hand 10 by making it possible to better close the end of the finger over the object. More specifically, for a same command from the common actuator 50, because of the decreasing stiffness of the joining pieces 35, 36 and 37, an increasing angular displacement of each of the articulations 27, 28 and 29 increasingly distant from the palm 11 will be obtained. The decreasing stiffness associated with a common actuator also makes it possible to obtain a progressive closure and opening kinematic for all the articulations of a finger. This kinematic is close to that of a human finger, which is moved by independent muscles. A finger according to the invention and moved by a single actuator is much easier to drive than a robotized finger having as many actuators as phalanges.

By way of exemplary embodiment implementing a common actuator 50, the motorization means comprise a cable 51 guided in each rigid armature 45, 46 and 47 and in the fitting piece 25. The cable 51 passes through the fitting piece 25 to the first phalanx 21 and from one phalanx to the next at a distance from the axis of the motorized degree of freedom in rotation. The cable 51 is actuated by the common actuator 50. FIG. 3 shows a distance d separating the axis 43 from the guiding of the cable 51 in the rigid armature 47 of the phalanx 23. This distance d makes it possible to obtain a motor torque of the articulation 29 when the cable 51 is tensioned by the common actuator 50.

The cable 51 can be embedded in the rigid armature 47 of the last phalanx 23 and run to the palm 11 only along an inner face 53 of the finger 14, that is to say the face intended to be in contact with the objects to be grasped. The common actuator 50, positioned in the palm 11 is then a single-acting actuator that can pull on the cable 51 to close the finger 14. When the cable 51 is relaxed, the stiffness of the joining pieces 35, 36 and 37 makes it possible to reopen the finger 14. Alternatively, the common actuator 50 can be a dual-acting actuator. When a cable 51 is implemented, associated with a dual-acting actuator 50, the cable 51 runs along the inner face 53 and along an outer face 54 of the finger 14, opposite the inner face 53. The cable 51 can be run at the same distance d from the axes 41, 42 and 43 for both faces 53 and 54 of the finger 14. The dual-acting actuator 50 can then pull on the cable 51 on the side of the inner face 53 to close the finger 14 or on the side of the outer face 54 to open the finger 14.

The force that the actuator 50 exerts on the cable 51 is proportional to the elastic deformation of the different joining pieces 35, 36 and 37. The maximum force that the actuator will be able to exert will be obtained either for a finger that is fully open or for a finger that is fully closed, that is say at one of the maximum angular positions of the articulations 27, 28 and 29. When the finger is closed over an object to be grasped, it is also necessary to take account of the force that is desired to be exerted on the object grasped to hold it in the hand 10.

In order to limit the maximum force that the actuator must exert, it is possible to define a neutral position of the finger for which no force is exerted on the cable 51. This neutral position depends on the form at rest of each of the joining pieces 35, 36 and 37. For example, each of the elastic joining pieces 35, 36 and 37 has a neutral position defined in such a way that the motorization means allow an angular travel of the articulation 27, 28 or 29 comprising the elastic joining piece 35, 36 or 37 concerned on either side of the neutral position.

The neutral position can be defined as mid-travel of the finger 14 between its two extreme positions, fully folded back toward the palm 11 of the hand 10 and at maximum extension when the directions 31 to 34 are aligned. It is also possible to displace this neutral position to favor one of the motorized movements of the finger 14, toward its extension or toward its folding back. For example, in order to allow a sufficient force from the finger on an object grasped, the neutral position can be defined closer to the folded back extreme position than the maximum extension position.

Advantageously, each phalanx 21, 22 and 23 comprises a flexible piece, respectively 56, 57 and 58 positioned on the inner face 53 of the finger 14. These flexible pieces, for example produced in a silicone-based material, make it possible, by being deformed in contact with an object grasped by the hand 10, to increase the contact surface area between each of the phalanges 21, 22 and 23 and the object grasped. The material chosen to produce the flexible pieces 56, 57 and 58 can have surface properties making it possible to improve the adhesion with the objects grasped. A silicone-based material is well suited to fulfilling this function. More generally, the flexible pieces, 56, 57 and 58 make it possible to improve the gripping of an object by means of a finger 14.

Figure 4:
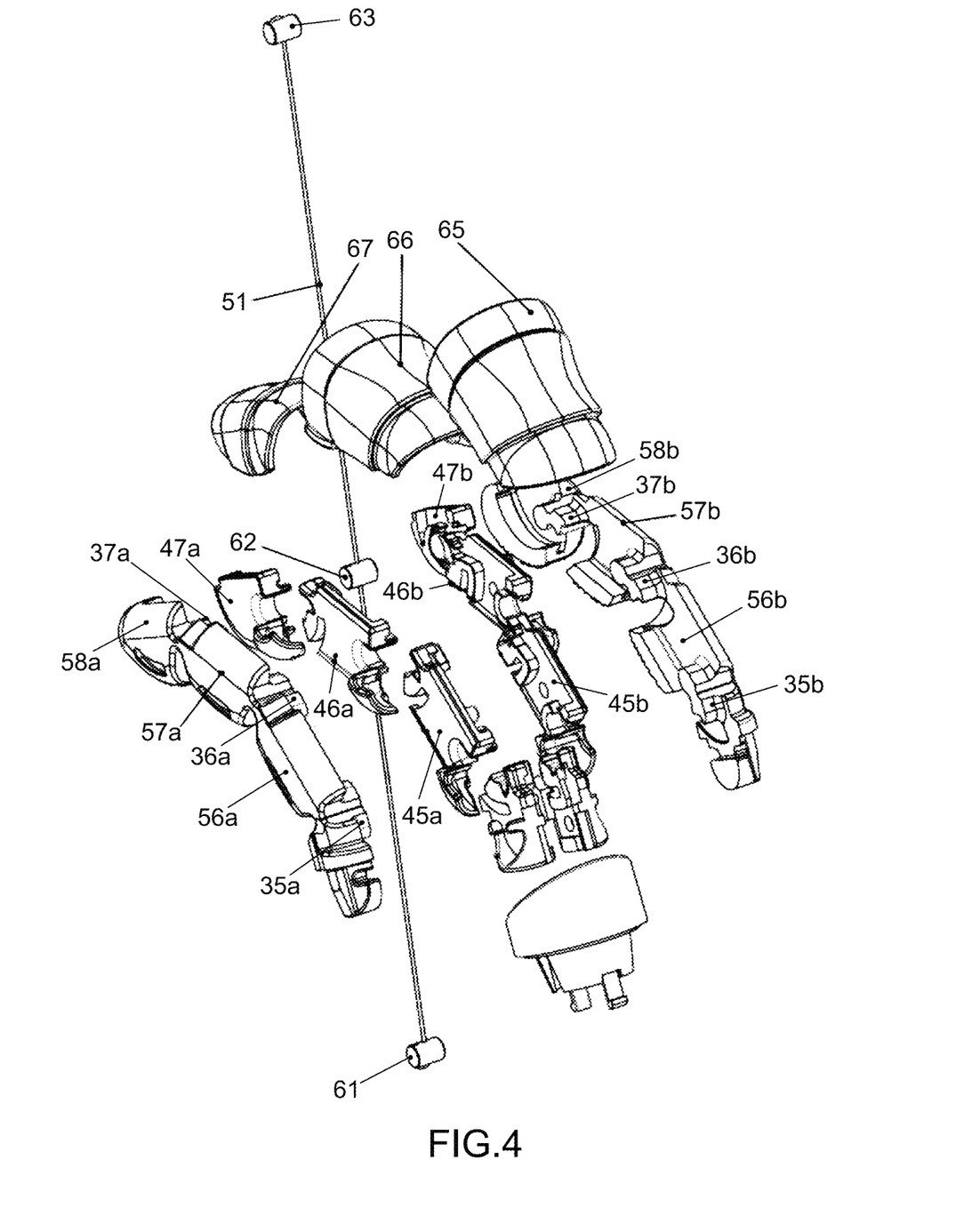
FIG. 4 represents an exploded view of the finger of FIG. 2.

FIG. 4 shows a perspective and exploded view of the finger 14. In the example represented, for each of the phalanges 21, 22 and 23, the rigid armature is formed in two parts, respectively 45*a* and 45*b* for the rigid armature 45, 46*a* and 46*b* for the rigid armature 46 and 47*a* and 47*b* for the rigid armature 47. For each armature, the two parts make it possible to simplify the mounting of the finger 14 in order to guide the cable 51 between the two parts. For each of the phalanges 21, 22 and 23, the two parts extend mainly on either side of the main direction of the phalanx concerned.

In FIG. 4, the cable 51 is shown rectilinear prior to mounting thereof guided between the two parts of each phalanx. The cable 51 comprises end fittings forming outgrowths fixed onto the cable 51 allowing each to immobilize a point of the cable 51. In the example represented, the cable 51 can be formed from a bundle of steel wires onto which three end fittings 61, 62 and 63 are molded or crimped. The end fittings 61 and 63 are each fixed to one of the ends of the cable 51. The end fittings 61 and 63 allow the actuator 50, when it is dual-acting, to pull on each of the ends of the cable 51. The end fitting 62 makes it possible to immobilize the cable 51 in the rigid armature 47 of the last phalanx 23 and the end fitting 62 can be fixed substantially at the middle of the cable 51 or offset relative to the middle depending on the desired amplitude of the movements of the finger 14. More specifically, the end fitting 62 is advantageously positioned at the end of the last phalanx 23. FIG. 3 represents the finger 14 in median position between an extended position in which the directions 31 to 34 are aligned and a position folded back toward the palm 11. In the median position, the length of a part 51*a* of the cable 51 allowing the extension of the finger 14 is greater than the length of a part 51*b* of the cable 51 allowing the folding back of the finger 14. The parts 51*a* and 51*b* of the cable 51 are situated on either side of the end fitting 62.

Alternatively, it is possible to fit two distinct cables each acting toward one of the extreme positions of the finger 14. The two distinct cables correspond to each of the parts 51*a* and 51*b*.

Advantageously, each phalanx 21, 22 and 23 comprises a shell, respectively 65, 66 and 67 covering the outer face 54 of the finger 14.

Advantageously, for each of the phalanges 21, 22 and 23, the shell and the flexible piece comprise complementary forms produced so as to produce an embedment of the armature, of the flexible piece and of the shell. It is possible to produce each embedment by deformation of the corresponding flexible piece. Any recourse to a fixing accessory such as a screw is thus avoided.

Figure 5:
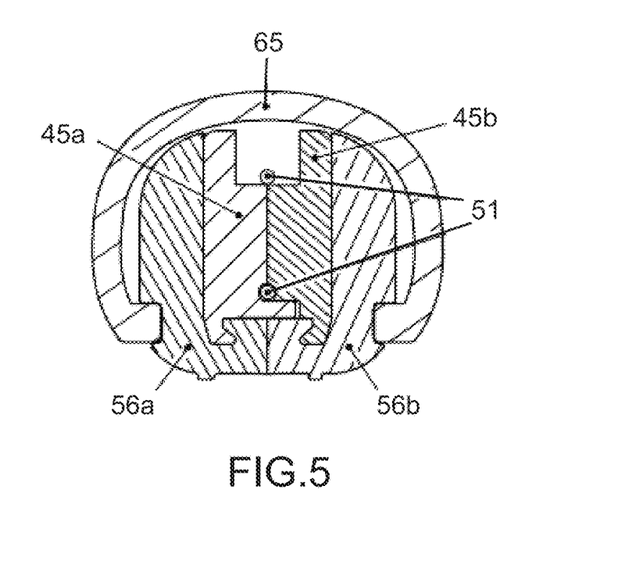
FIG. 5 represents the finger of FIG. 2 in transverse cross section.

FIG. 5 represents the finger 14 in transverse cross section on the phalanx 21. The other phalanges 22 and 23 have similar cross sections.

Advantageously, to facilitate the manufacture and the assembly thereof, for each of the phalanges 21, 22 and 23, the flexible piece is formed in two parts surrounding the rigid armature. More specifically, the flexible piece 56 is formed from two parts 56*a* and 56*b*. The flexible piece 57 is formed from two parts 57*a* and 57*b* and the flexible piece 58 is formed from two parts 58*a* and 58*b*. The two parts of each flexible piece surround the rigid armature. For each of the phalanges 21, 22 and 23, the two parts of the flexible pieces extend mainly on either side of the main direction of the phalanx concerned. This arrangement is clearly visible in FIG. 5.

Advantageously, the different flexible pieces and the different joining pieces can be produced by grouping them together in halves longitudinally. The elastic joining pieces 35, 36 and 37 can be defined in such a way that the main directions 31, 32 and 33 of the different phalanges, and the main direction 34 of the fitting piece 25, remain in a plane called longitudinal plane of the finger 14 when no stress is exerted on the joining pieces 35, 36 and 37 according to their non-motorized degrees of freedom. This is the cross-sectional plane of FIG. 3. The grouping together in halves is done on either side of the longitudinal plane.

More specifically, the joining pieces 35, 36 and 37 can, as for the flexible pieces 56, 57 and 58, be produced in two parts. The joining piece 35 is formed from two parts 35*a* and 35*b*. The joining piece 36 is formed from two parts 36*a* and 36*b*. The joining piece 37 is formed from two parts 37*a* and 37*b*. The parts 35*a*, 56*a*, 36*a*, 57*a*, 37*a* and 58*a* can be produced in a single molded piece, for example of silicone. Similarly, the parts 35*b*, 56*b*, 36*b*, 57*b*, 37*b* and 58*b* can be grouped together in a single piece. The grouping together of the different pieces makes it possible to simplify the manufacture of the finger by combining several functions in a same mechanical piece, namely improving the gripping of an object by means of the finger 14 and the flexibility of each articulation of the finger 14.

Figure 6A:
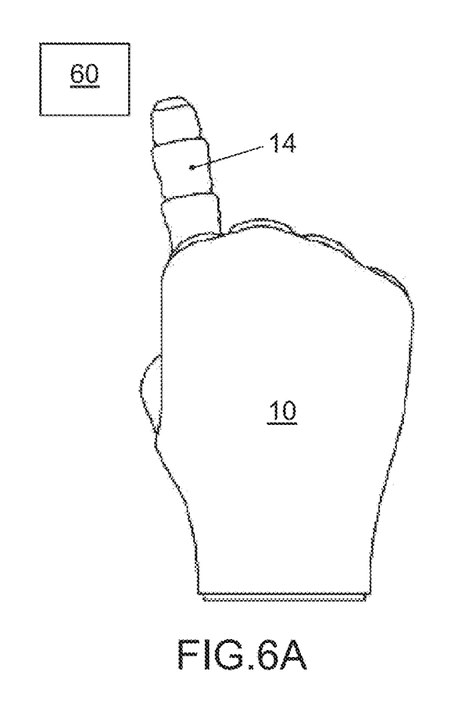
FIGS. 6A and 6B represent the compliance of a finger when it encounters an obstacle.
Figure 6B:
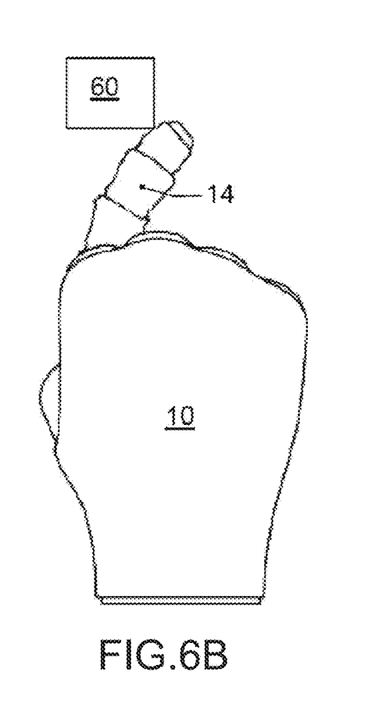

FIGS. 6A and 6B represent the compliance of a finger when it encounters an obstacle. In FIG. 6A, the hand 10 is represented with its index finger extended. An object 60 is situated at a distance from the hand 10, without touching it. The motorization of the finger 14 allows the finger 14 to be folded back in a movement substantially at right angles to the plane of FIGS. 6A and 6B. In FIG. 6B, the index finger 14 enters into contact with the object 60. The relative movement of the hand 10 and of the object 60 takes place in the plane of FIGS. 6A and 6B. In the example chosen, the motorization of the finger 14 does not allow the hand to avoid contact with the object 60. The different elastic joining pieces 35, 36 and 37 are deformed and allow the finger 14 to accept the external stress due to the presence of the object 60 without suffering damage or without requiring complex driving of the robot equipped with the hand.

The invention claimed is:

1. A hand intended for a humanoid robot, the hand comprising a palm and at least one finger articulated to the palm, the finger comprising at least one phalanx and an articulation linking the phalanx to the palm, the phalanx extending in a main direction, the articulation further comprising an elastic joining piece allowing several degrees of freedom, the several degrees of freedom including at least three degrees of freedom in rotation, the hand further comprising motorization means for a degree of freedom in rotation out of the several degrees of freedom made possible by the joining piece, the motorized degree of freedom in rotation allowing a relative movement about an axis at right angles to the main direction of the phalanx, wherein other degrees of freedom out of the several degrees of freedom made possible by the joining piece are not motorized and wherein the elastic joining piece has a neutral position defined in such a way that the motorization means allow an angular travel of the articulation comprising the elastic joining piece concerned on either side of the neutral position, and wherein different degrees of freedom of articulation are achieved by the elasticity of the elastic joining piece.

2. The hand as claimed in claim 1, the finger further comprising several consecutive phalanges, two consecutive phalanges being linked by at least one articulation, wherein each of the at least one articulation linking two consecutive phalanges comprises an elastic joining piece allowing several degrees of freedom between the two consecutive phalanges, wherein the hand comprises motorization means for a degree of freedom in rotation out of the degrees of freedom made possible by the joining piece linking the consecutive phalanges, the motorized degree of freedom in rotation allowing a relative movement of the two consecutive phalanges about an axis at right angles to the respective main direction of the two consecutive phalanges, wherein the other degrees of freedom out of the degrees of freedom made possible by the joining piece linking the consecutive phalanges are not motorized and in that each joining piece linking the consecutive phalanges has a neutral position defined in such a way that the motorization means allow an angular travel of the at least one articulation comprising the elastic joining piece concerned on either side of the neutral position.

3. The hand as claimed in claim 2, wherein different elastic joining pieces each have a stiffness that decreases along a distance in a direction away from the palm.

4. The hand as claimed in claim 2, the motorization means further comprising an actuator, wherein the actuator is common to each of the at least one articulation of the at least one finger.

5. The hand as claimed in claim 4, each phalanx of the phalanges further comprising a rigid armature, the motorization means further comprising a cable guided in each rigid armature, the cable passing from one phalanx of the phalanges to the next phalanx of the phalanges in a direction away from the axis of the motorized degree of freedom in rotation and the cable being actuated by the actuator.

6. The hand as claimed in claim 5, wherein the rigid armature of each phalanx of the phalanges is formed in two parts between which the cable is guided.

7. The hand as claimed in claim 4, the actuator being a dual-acting actuator.

8. The hand as claimed in claim 1, the phalanx further comprising a rigid armature and a flexible piece positioned on an inner face of the finger.

9. The hand as claimed in claim 8, the phalanx further comprising a shell positioned on an outer face of the finger and wherein the shell and the flexible piece comprise complementary forms produced so as to produce an embedment of the rigid armature, of the flexible piece and of the shell.

10. The hand as claimed in claim 8, wherein the flexible piece is formed from two parts surrounding the rigid armature.

11. The hand as claimed in claim 8, wherein the flexible pieces and the joining piece or pieces are produced by grouping them together in halves longitudinally.

12. A hand intended for a humanoid robot, the hand comprising a palm and at least one finger articulated to the palm, the finger comprising at least one phalanx and an articulation linking the phalanx to the palm, the phalanx extending in a main direction, the articulation further comprising an elastic joining piece allowing several degrees of freedom, the hand further comprising motorization means for a degree of freedom in rotation out of the several degrees of freedom made possible by the joining piece, the motorized degree of freedom in rotation allowing a relative movement about an axis at right angles to the main direction of the phalanx, wherein other degrees of freedom out of the several degrees of freedom made possible by the joining piece are not motorized and wherein the elastic joining piece has a neutral position defined in such a way that the motorization means allow an angular travel of the articulation comprising the elastic joining piece concerned on either side of the neutral position, each phalanx further comprising a rigid armature, and the motorization means further comprising a cable guided in each rigid armature, the cable passing from one phalanx to the next phalanx in a direction away from the axis of the motorized degree of freedom in rotation and the cable being actuated by an actuator.

13. The hand as claimed in claim 12, wherein the rigid armature of each phalanx is formed in two parts between which the cable is guided.

14. A hand intended for a humanoid robot, the hand comprising a palm and at least one finger articulated to the palm, the finger comprising at least one phalanx and an articulation linking the phalanx to the palm, the phalanx extending in a main direction, the articulation further comprising an elastic joining piece allowing several degrees of freedom, the hand further comprising motorization means for a degree of freedom in rotation out of the several degrees of freedom made possible by the joining piece, the motorized degree of freedom in rotation allowing a relative movement about an axis at right angles to the main direction of the phalanx, wherein other degrees of freedom out of the several degrees of freedom made possible by the joining piece are not motorized and wherein the elastic joining piece has a neutral position defined in such a way that the motorization means allow an angular travel of the articulation comprising the elastic joining piece concerned on either side of the neutral position, the phalanx further comprising a rigid armature and a flexible piece positioned on an inner face of the finger.

15. The hand as claimed in claim 14, the phalanx further comprising a shell positioned on an outer face of the finger and wherein the shell and the flexible piece comprise complementary forms produced so as to produce an embedment of the rigid armature, of the flexible piece and of the shell.

16. The hand as claimed in claim 14, wherein the flexible piece is formed from two parts surrounding the rigid armature.

17. The hand as claimed in claim 14, wherein the flexible pieces and the joining piece or pieces are produced by grouping them together in halves longitudinally.

* * * * *